Fig. 1
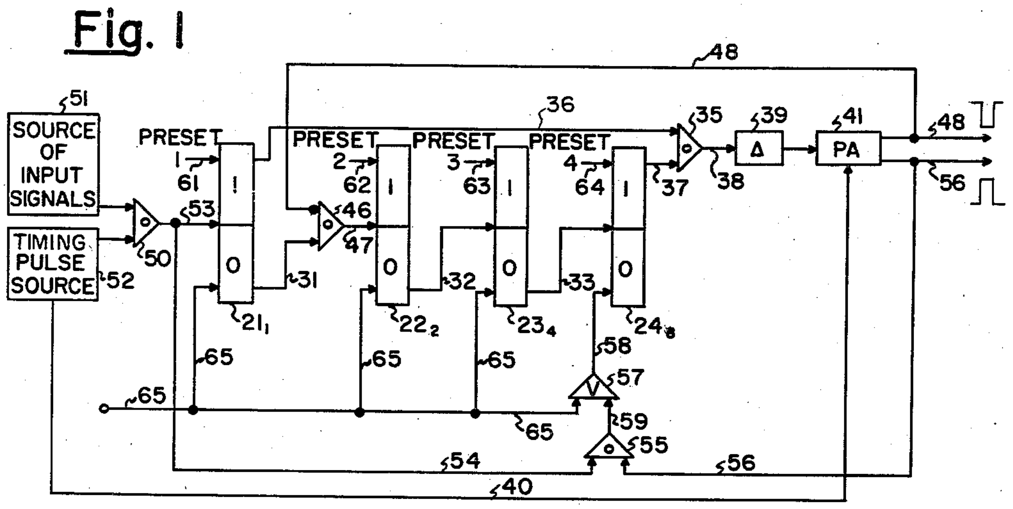
Fig. 4
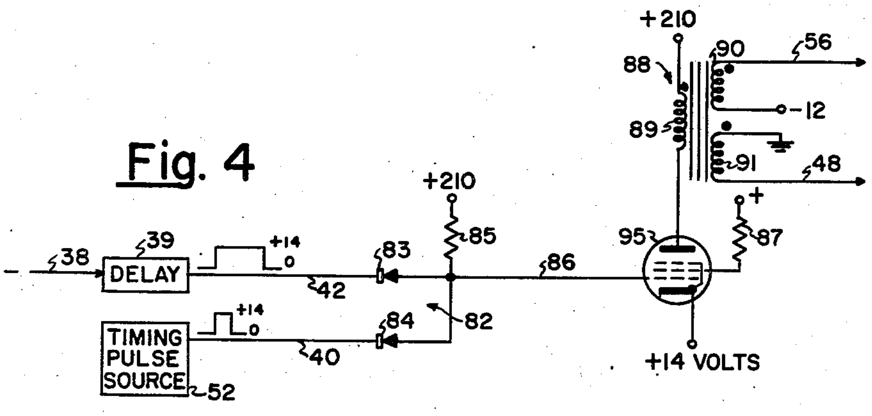
| COUNT | FLIP-FLOP STAGE $21_1$ | $22_2$ | $23_4$ | $24_8$ | $E_0$ |
|---|---|---|---|---|---|
| 0 | 0 | 0 | 0 | 0 | 0 |
| 1 | 1 | 0 | 0 | 0 | 0 |
| 2 | 0 | 1 | 0 | 0 | 0 |
| 3 | 1 | 1 | 0 | 0 | 0 |
| 4 | 0 | 0 | 1 | 0 | 0 |
| 5 | 1 | 0 | 1 | 0 | 0 |
| 6 | 0 | 1 | 1 | 0 | 0 |
| 7 | 1 | 1 | 1 | 0 | 0 |
| 8 | 0 | 0 | 0 | 1 | 0 |
| 9 | 1 | 0 | 0 | 1 | 1 |
| 0 | 0 | 0 | 0 | 0 | 0 |
Fig. 3
*INVENTOR.*
JOHN O. PAIVINEN
*BY* Thomas B. Horton
AGENT Feb. 25, 1958

J. O. PAIVINEN

DECADE COUNTER FOR PRODUCING AN OUTPUT AT THE COUNT OF NINE 2,824,961

Filed March 4, 1955

2 Sheets-Sheet 2

INVENTOR.
JOHN O. PAIVINEN

BY Thomas B. Horton

AGENT 2,824,961

DECADE COUNTER FOR PRODUCING AN OUTPUT AT THE COUNT OF NINE

John O. Paivinen, Berwyn, Pa., assignor to Burroughs Corporation, Detroit, Mich., a corporation of Michigan Application March 4, 1955, Serial No. 492,202

3 Claims. (Cl. 250—27)

This invention relates to counting devices and more particularly to electronic decade counters which utilize a series of binary coupled flip-flop stages.

Methods have previously been employed for converting a binary counter to a decade counter. Such methods have required the triggering of one flip-flop stage from another. This has been accomplished by inter-stage networks which convert the flip-flop transition from one state to another into a pulsed waveform. Such coupling circuits of the prior art, however, either have resulted in small triggering potentials, high circuit loading or excessive noise or have been complex and expensive in construction.

Furthermore, it has been difficult to reset prior art counters to begin a count and some circuits are not readily adaptable to storage of decimal numbers, since they depend upon bi-quinary or other operation.

An object of the invention is to provide improved means for producing a decade count with a modified binary counter.

An ancillary object of the invention is to provide an improved flip-flop coupling circuit which produces a pulsed output signal in response to transition from one state to another.

According to the invention a decade counter is comprised of four binary coupled flip-flop stages which may be coupled for counting in response to a source of signal pulses. A counter output circuit is coupled to and coincidently controlled by the first and fourth flip-flop stages to provide output signals indicative of the count of nine. Included in the coupling between the first and second stages is an inhibit circuit coupled to and controlled by the counter output circuit for preventing a change of state of the second flip-flop stage from signals occurring during transition of the first stage when the counter indicates a count of nine. Finally, a clearing circuit is coupled to and under the coincident control of both input pulses from the source of signals to be counted and signals developed at the counter output circuit and operates to clear the fourth stage in response to the tenth signal to be counted, to thereby automatically reset the counter with the tenth input pulse.

Other objects and advantages will become apparent when the following description of the invention is read with reference to the accompanying drawings of which:

Fig. 1 is a logical diagram of the decade counter of the invention;

Fig. 3 is a chart illustrating the manner in which the decade counter operates; and, Fig. 4 is a detailed wiring diagram of a pulse amplifier utilized in the invention.

Figure 2:
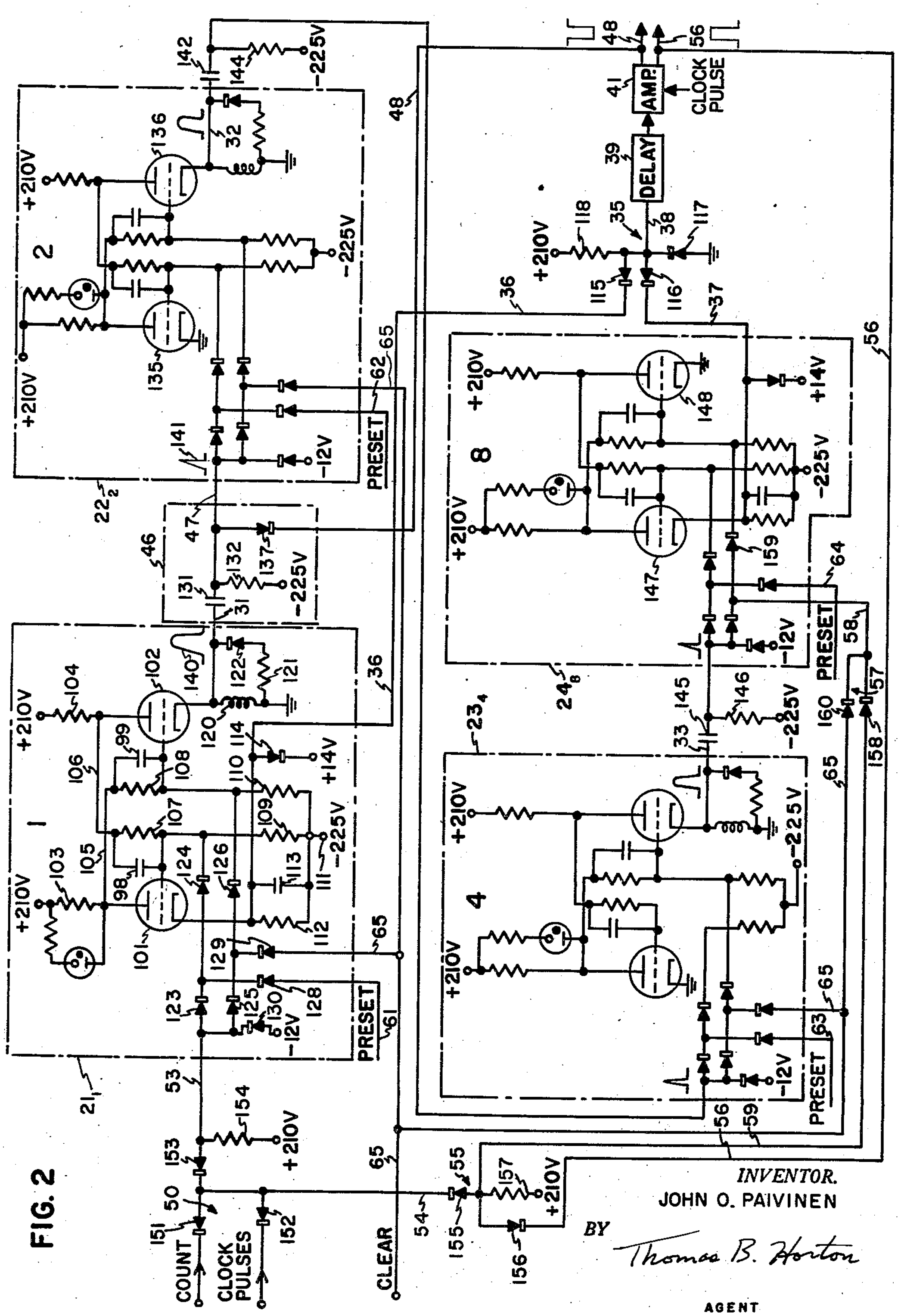
Fig. 2 is a detailed wiring diagram of the counter of the invention.

The counter of the invention comprises a four stage binary counter which is modified to yield a decade count. This modification is accomplished by the utilization of gating circuits to interrupt the binary cycle at binary nine and to reset the counter to binary zero in response to the tenth input signal to be counted.

Referring now to the logical diagram of the counter illustrated in Fig. 1, the counter is comprised of the four binary connected bi-stable flip-flops $21_1$, $22_2$, $23_4$, and $24_8$ representing the binary counting stages 1, 2, 4, and 8, respectively, as indicated by the subscripts accompanying each of the reference characters. Each flip-flop is controlled by a single input conductor to which positive pulses are applied in order to complement the state of the flip-flop; that is, to cause the flip-flop to switch from its resident state to the opposite state. Each of the flip-flops $21_1$, $22_2$, and $23_4$ produces a positive output pulse upon the corresponding output conductor 31, 32, and 33 when the respective flip-flops are switched from the on or "1" state to the off or "0" state. It is to be specially noted that the output signals produced upon the conductors 31, 32, and 33 when their associated flip-flops are switched from "1" to "0" are pulse outputs and not merely a change in D.-C. potential level. The output conductor 32 of the second flip-flop stage $22_2$ is connected to the complementing input conductor 47 of the third flip-flop stage $23_4$, and in turn output conductor 33 of the third flip-flop stage $23_4$ is connected to the complementing input conductor of the fourth flip-flop $24_8$. Every time the second flip-flop $22_2$ switches from the "1" to the "0" state, it transmits a positive pulse to the complementing input of the third flip-flop $23_4$ to effect switching of the latter. Similarly, each time the third flip-flop $23_4$ switches from the "1" to the "0" state, switching of the fourth flip-flop $24_8$ is effected.

Interposed between the output conductor 31 of the first flip-flop stage $21_1$ and the complementing input conductor 47 of the second flip-flop stage $22_2$ is an inhibit gate 46. The gate 46 is inhibited by the potentials applied to its second input conductor 48 by pulse amplifier 41 which comprises the output circuit for the decade counter. The inhibit gate 46 depends for its operation upon the interaction of opposing signals from the first flip-flop stage and the pulse amplifier 41. Normally the potential upon conductor 48 is a D.-C. potential which permits the passage of the positive-going pulse from the first flip-flop to the second flip-flop to accomplish switching of the latter. However, as will be shown hereinafter, when the counter reaches the count of nine and in response to the application of the following timing pulse, the pulse amplifier 41 functions to apply a negative pulse to the input conductor 48 of gate 46 coincidently with the transmission by the first flip-flop $21_1$ of the positive pulse on conductor 31 to the inhibit gate 46. By bucking the negative pulse against the positive pulse the positive pulse is canceled whereby the potential of the complementing input conductor 47 is prevented from becoming positive; and switching of the second flip-flop in response to a signal from the first flip-flop is prevented.

The first and fourth flip-flop stages have further output conductors 36 and 37, respectively, which assume one or the other of two D.-C. potential levels in accordance with the state of the flip-flop and which provide a source of D.-C. control potentials for gating signals at output gate 35, which is described hereinafter in greater detail.

The input circuit for the decade counter comprises the coincidence gate 50 to which are applied both information signals from a source of input signals 51 and periodic clock pulse signals from a clock pulse source 52. The clock pulses establish the basic counting rate of the counter and are positive-going, narrow pulses. The information pulses comprise interspersed binary one and binary zero signals which are synchronized with the clock pulses and of which it is desired to count only the binary one signals. In response to the coincident application of a binary one signal and a clock pulse, input gate 50 applies a positive pulse to conductor 53 to complement the first flip-flop $21_1$. However, the coincident application of a binary zero signal and a clock pulse to the coincidence gate 50 produces no output pulse therefrom.

It is the function of coincidence gate 55 to effect resetting of the fourth flip-flop stage $24_8$ to the "0" state in response to the tenth input signal to be counted. Accordingly the conductor 54 supplies the coincidence gate 55 with signals to be counted from the input coincidence gate 50. The coincidence gate 55 is further connected by a conductor 56 to the pulse amplifier 41 which, as will be shown hereinafter, conditions the gate 55 to either pass or inhibit the signals to be counted in accordance with the count attained by the counter. The coincidence gate 55 is connected by conductor 59 and "or" gate 57 to the reset input conductor 58 of the fourth flip-flop stage $24_8$. Only when the counter reaches the count of nine does the pulse amplifier 41 apply a positive pulse to the input conductor 56 of the coincidence gate 55 coincidently with the application of the signal to be counted to the other input conductor 54 of the coincidence gate 55. This positive pulse conditions the gate 55 to pass a positive signal via conductor 59 and "or" gate 57 to the reset conductor 58 of the fourth flip-flop $24_8$ to effect resetting of the flip-flop $24_8$ to its "0" state. "Or" gate 57 may be any circuit capable of passing a positive pulse applied to either of its inputs 59 or 65.

The normally cut-off pulse amplifier 41 which comprises the output circuit for the counter is conditioned for conduction in accordance with the states of the first and fourth flip-flop stages $21_1$ and $24_8$ and is triggered by a clock pulse from source 52 if properly conditioned. Accordingly, a coincidence gate 35 controlled by conductors 36 and 37 from the respective flip-flops $21_1$ and $24_8$ is connected by a delay circuit 39 to the pulse amplifier 41. A conductor 40 connects the pulse amplifier 41 with the source of clock pulses 52. When the count reaches nine both of the flip-flops $21_1$ and $24_8$ are in the "1" state. The coincidence gate 35 in response to the coincident setting of the flip-flops $21_1$ and $24_8$ to the "1" state applies a conditioning potential through the delay circuit 39 to the pulse amplifier 41 in order to condition the latter to be triggered by the succeeding clock pulse. The delay circuit 39 insures that the pulse amplifier 41 is not conditioned in time to be triggered by the same clock pulse which sets the counter to the nine count. When the pulse amplifier is triggered on, a negative inhibiting pulse is applied to conductor 48 and a positive pulse is applied to conductor 56 to condition the respective gates 46 and 55 to inhibit and pass their signals.

In order to arbitrarily preset the counter to any count the flip-flop stages $21_1$, $22_2$, $23_4$, and $24_8$ are provided with the preset input conductors 61, 62, 63, and 64, respectively. A positive signal applied to one of the preset conductors sets the associated flip-flop stage to its "1" state, if not already in the "1" state.

In order to clear the counter, that is, set it to zero count, a clear conductor 65 is commonly connected to the "0" state side of each of the flip-flop stages $21_1$, $22_2$, and $23_4$ and through "or" gate 57 to the "0" state side of flip-flop stage $24_8$. Clearing of the counter is accomplished by the application of a positive clear signal to all of the flip-flop stages simultaneously whereby all of the flip-flop stages are driven to their "0" states.

In order to demonstrate the manner in which the decade counter operates a complete counter cycle will be described with reference to the chart of Fig. 3.

Assume first that the clear circuit has been operated whereby all of the flip-flop stages $21_1$, $22_2$, $23_4$, and $24_8$ are in the "0" state, and the counter stands at zero count. Initially, gate 46 is uninhibited and gate 55 has no coincident signals. These gates remain in this condition except when the count reaches nine. The first signal to be counted complements the state of the first flip-flop stage $21_1$, which is set to the "1" state. The second signal to be counted resets the first flip-flop stage $21_1$ to the "0" state, and the flip-flop stage $21_1$ when switched to its "0" state transmits a pulse to flip-flop stage $22_2$ to set the latter to the "1" state. In response to the third input signal to be counted, flip-flop stage $21_1$ is set to the "1" state. Thus both flip-flop stages $21_1$ and $22_2$ are in the "1" state to indicate a count of three. The fourth signal to be counted effects resetting of the first flip-flop stage $21_1$ which in switching to the "0" state transmits a signal to the second flip-flop stage $22_2$ to reset the latter to the "0" state, and in turn the second flip-flop stage $22_2$ when switched to the "0" state transmits a signal to the third flip-flop stage $23_4$ to switch the latter to its "1" state. Hence to indicate a four count only the third flip-flop stage $23_4$ is in the "1" state, and the other flip-flops are in the "0" state. In order to represent five, the third flip-flop stage $23_4$ remains in the "1" state and the first flip-flop stage $21_1$ is switched to the "1" state in response to the fifth signal to be counted.

Continuing, the sixth input signal to be counted effects resetting of first flip-flop stage $22_2$ to the "0" state which in turn triggers the second flip-flop to the "1" state. Hence it is seen that a six is represented by flip-flop stages $22_2$ and $23_4$ being in the "1" state and the remaining flip-flop stages being in the "0" state. The seventh input signal to be counted adds the first flip-flop stage $21_1$ to the flip-flop stages $22_2$ and $23_4$ which are already in the "1" state. In response to the eighth input signal all of the flip-flop stages $21_1$, $22_2$, and $23_4$ are switched to the "0" state, and as the flip-flop stage $23_4$ switches to the "0" state it transmits a complemental signal to the fourth flip-flop stage $24_8$ to switch it to the "1" state. To represent nine the first flip-flop stage $21_1$ is switched to the "1" state in response to the ninth input signal to be counted. Hence a nine, as stated hereinabove, is represented by flip-flop stages $21_1$ and $24_8$ assuming the "1" state and the other stages assuming the "0" state. Through and including the count of nine, the operation of the counter is pure binary; however, in order for the counter to operate as decade counter, it is necessary that it be reset to zero in response to the tenth input signal to be counted.

The counter is conditioned to accomplish this reset to zero by the switching of amplifier circuit 41 to its "on" condition in response to the timing pulse following the ninth input pulse whereby gate 46 becomes inhibited and gate 55 passes a signal with the application of the tenth input pulse. Accordingly, in response to the tenth input signal to be counted, a complementing signal is applied to input conductor 53 to switch the first flip-flop $21_1$ to the "0" state; and because the gate 46 is inhibited the signal transmitted by first flip-flop $21_1$ when it is reset does not switch the second flip-flop $22_2$ which is already in the "0" state. Further the tenth input signal also effects application of a complementing signal by means of conductor 54, "and" gate 55 and "or" gate 57 to the fourth flip-flop stage $24_8$ to reset it to the "0" state. Hence, as indicated by the chart of Fig. 4, after counting the tenth signal all four flip-flop stages assume the "0" state, and the counter is reset to its initial condition. An output signal is presented by pulse amplifier 41 only when the count reaches nine.

Having described the counter and its operation in terms of the logical diagram, a preferred embodiment of the circuit will now be described in detail with reference to Fig. 2. For convenience like components of Fig. 2 retain the same reference characters as in Fig. 1.

The bi-stable flip-flop 21 comprises a pair of triodes 101 and 102 which have their anodes connected through resistors 103 and 104 to a potential source of +210 volts. Criss-cross connections 105 and 106 connect the anodes of the triodes through resistances 107 and 108 to the respectively opposite control grids. Additionally, shunting capacitors 98 and 99 are provided for the resistors 107 and 108, respectively. The control grids of triodes 101 and 102 are also connected through the resistances 109 and 110 to the terminal 111 of a potential source of −225 volts. An output conductor 36 is projected from the cathode of triode 101, and the cathode is further connected to the terminal 111 through a resistor 112 by-passed by a capacitor 113 to thus produce an output D.-C. level indicative of the flip-flop state. In order to limit the D.-C. potentials assumed by the output line 36, output line 36 is clamped by diode 114 to a maximum potential of +14 volts with triode 101 conducting, and by the diodes 115 and 117 of "and" gate 35 to a minimum potential of ground with triode 101 cut off. The cathode of triode 102 is connected through a choke coil 120 to ground, and the output conductor 31 is projected from the cathode. A damping resistor 121 and diode 122 are serially connected from ground to the output conductor 31 and shunt the choke coil 120. The choke coil 120 comprises a resonant circuit which produces a sharp, positive-going output pulse of approximately 30 volts upon the output conductor 31 when the triode 102 becomes conducting. The damping resistor 121 and diode 122 function to prevent ringing and thereby permit only the single sharp, positive pulse 140 to be produced upon output conductor 31 when the triode 102 switches on.

The set or "1" state of the flip-flop $21_1$ is defined as the condition under which triode 101 conducts and triode 102 is cut off, to thus produce a high D.-C. level at lead 36. The reset or "0" state of the flip-flop $21_1$ is defined by the opposite conductive states wherein triode 102 conducts and triode 101 is cut off, and thus a pulse 140 is produced during transition to state "0" at lead 31.

In order to effect switching of the flip-flop, the input conductor 53 is connected through diodes 123 and 124 to the control grid of the triode 101 and through diodes 125 and 126 to the control grid of the triode 102. The diodes 123, 124, 125, and 126 are so oriented that a positive pulse on input conductor 53, for example, a pulse which raises the conductor 53 to zero volts, is passed to the control grid of the non-conducting triode whose control grid potential is negative with respect to the positive pulse potential. However, the positive pulse on input conductor 53 is blocked from the grid of the conducting triode whose control grid potential is positive with respect to the positive pulse potential because of the intermediate diodes 124 and 126. Thus the positive input signals are always applied to the control grid of the non-conducting triode and effect switching of the flip-flop to produce the complement of the state of the flip-flop at the time the input signal is applied.

In order to preset the flip-flop 21 to its set, or "1" state, an input conductor 61 is connected through a diode 128 to the junction of the diodes 123 and 124. Assuming triode 102 to be conducting and triode 101 to be cut off, the application of a positive pulse to the input conductor 61 finds the diodes 128 and 124 properly oriented so that the positive pulse reaches the control grid of the triode 101 and causes it to conduct, whereupon the flip-flop assumes its "1" state. In order to clear, or reset, the flip-flop $21_1$, an input conductor 65 is connected through a diode 129 to the juncture of the diodes 125 and 126.

Finally, in order to limit the negative potential swing of the control grids of the triodes 101 and 102, the input lead 53 is clamped by diode 130 to a −12 volt source. By limiting the extreme to which the grid of the non-conducting triode goes negative, less time is required to raise the grid of said triode to a conducting potential. Thereby a shorter response time and faster switching of the flip-flop is obtained. Without this clamping means the grid of the non-conducting triode assumes a negative potential of −30 volts or thereabouts. The diodes 124 and 126 can be omitted, if desired, but they are useful in reducing the loading imposed upon the flip-flop by the parallel back resistances of the other diodes.

In order to give a visual indication when the flip-flop $21_1$ is in the "1" state, a neon lamp and a resistor are connected in series across the anode resistor 103 of triode 101. When the flip-flop is in the "1" state triode 101 conducts and the potential difference across the anode resistor 103 is more than sufficient to ignite the neon lamp. With triode 101 cut off there is no potential drop across the anode resistor and the neon lamp remains off.

Because the other three flip-flop stages $22_2$, $23_4$, and $24_8$ are quite similar to the flip-flop stage $21_1$, only the manner in which they differ from flip-flop 21 will be described.

The output conductor 31 of the flip-flop stage $21_1$ is coupled to the input conductor 47 of flip-flop $22_2$ by a capacitor 131. A resistor 132 connects conductor 47 to a potential source of −225 volts. Flip-flop $22_2$ differs from flip-flop $21_1$ in that no useful output signal is necessary from the left hand triode 135, which conducts when the flip-flop is in the "1" state. Accordingly, the cathode of triode 135 is connected directly to ground. As in the case of flip-flop $21_1$ a "clear" input conductor 65 is provided to reset the flip-flop $22_2$ to the "0" state, and a preset conductor 62 is provided to set the flip-flop $22_2$ to the "1" state.

Each time that the first flip-flop $21_1$ switches from the "1" to the zero state a positive-going pulse 140 of approximately 30 volts is transmitted through capacitor 131 to the input conductor 47 of the second flip-flop stage $22_2$. In response to the application of the positive-going pulse, the potential of input conductor 47 starts upward from its clamped potential of −12 volts and as soon as the grid of the non-conducting triode is sufficiently positive, the non-conducting triode starts to conduct and the flip-flop switches to the opposite state. The circuit constants are so chosen that the flip-flop $22_2$ can actually change the charge on capacitor 131 and thus drive conductor 47 down to the clamped potential of −12 volts. In this manner the waveform of the pulse applied to conductor 47 is chopped short as indicated by the waveforms 140 and 141 and cannot cause spurious double triggering of the flip-flop $22_2$. The circuit parameters of the other flip-flops are also chosen with this type of operation in mind.

In order to inhibit the transfer of a switching signal from the first flip-flop stage $21_1$ to the second flip-flop stage $22_2$ in response to the tenth input signal to be counted, the input conductor 47 of the second flip-flop conductor is connected by a diode 137 and the conductor 48 to the pulse amplifier 41. Normally the pulse amplifier 41 applies a potential by the conductor 48 to the cathode of diode 137 which maintains the diode 137 cut off. However, in response to the application to the counter of the timing pulse following the ninth input signal, the potential of the conductor 48 and the cathode of the diode 137 is pulled down to a potential of −12 volts by a negative pulse from the pulse amplifier 41 coincidently with the transmission of the positive pulse from the first flip-flop $21_1$ upon the conductor 31. With the cathode of diode 137 at −12 volts, the diode conducts and applies the negative volt pulse to one side of the capacitor 131 at the same time the positive pulse is applied to the opposite side, and the negative pulse holds the input conductor 47 of the second flip-flop sufficiently negative to prevent switching of the flip-flop.

The output conductor 32 which is projected from the cathode of the right hand triode 136 of the second flip-flop stage $22_2$ also comprises the complementing input conductor to the third flip-flop stage $23_4$. A capacitor 142 is inserted in the conductor 32 and a resistor 144 connects the third flip-flop $23_4$ side of the capacitor to a source of −225 volts. The third flip-flop $23_4$ is identical to the second flip-flop $22_2$. A clear input conductor 65 and a preset conductor 63 are provided and operate in the same manner as the clear and present conductors 65 and 61 for the first flip-flop $21_1$.

Similarly, the output conductor 33 of the third flip-flop stage $23_4$ also comprises the input conductor for flop-flop $24_8$ and includes a capacitor 145. A resistor 146 connects the flip-flop $24_8$ side of the capacitor to a source of −225 volts. The fourth flip-flop $24_8$ differs from the first flip-flop only in that no useful pulse output is necessary at the cathode of the right hand triode 148 which conducts when the flip-flop is in the "0" state. However, the output conductor 37 is projected from the grid of the left hand triode 147 in the same manner as output conductor 36 of the first flip-flop stage $21_1$. With flip-flop $24_8$ reset to the "0" state, the output conductor 37 assumes a zero volt potential. Conversely, with the flip-flop $24_8$ set to the "1" state the output conductor 37 assumes a +14 volt potential. The fourth flip-flop stage $24_8$ input 64 is provided to preset the flip-flop in the same manner that preset input 61 presets the first stage $21_1$. Clearing of the fourth flip-flop stage is accomplished by the application of a positive potential to the clear input conductor 65 which is connected through diode 160, conductor 58, and diode 159 to the control grid of triode 148.

As stated hereinabove "and" gate 35 functions to condition the amplifier circuit 41. The "and" gate 35 comprises a pair of diodes 115 and 116 having their anodes connected through a resistor 118 to a source of +210 volts and having their cathodes connected to the conductors 36 and 37, respectively. The commonly connected anodes of the diodes115 and 116 are also connected by diode 117 to ground. Finally the "and" gate output conductor 38 connects the commonly connected anodes to the delay circuit 39. When the counter reaches the count of nine, both the first flip-flop stage $21_1$ and the fourth flip-flop stage $24_8$ are in the "1" state and both conductors 36 and 37 apply a +14 volt D.-C. level to the cathodes of diodes 115 and 116, respectively. With the anodes of both diodes 115 and 116 connected through resistor 118 to the +210 volt potential, both diodes 115 and 116 conduct equally to place the +14 volt potential upon the "and" gate output conductor 38. If only one of the flip-flop stages $21_1$ and $24_8$ is in the "1" state, one of the conductors 36 and 37 will be at a +14 volt potential and the other a zero volt potential. Under these conditions, the diode with the zero volt potential conducts and applies the zero volt potential to the output conductor 38. Likewise with both flip-flop stages $21_1$ and $24_8$ in the "0" state, the conductors 36 and 37 both assume zero volt potentials and both conduct to pass the zero volt potential to the "and" gate output conductor 38. The diode 117 functions as a clamping diode which prevents the triggering of one flip-flop stage from spuriously triggering the other flip-flop stage connected to the gate.

The delay circuit 39 which is interposed between the coincidence gate 35 and the pulse amplifier 41 may be any suitable type, for example, an L–C delay circuit.

A preferred embodiment of the pulse amplifier 41 is illustrated in Fig. 4. A pentode 95 has its plate connected to the lower end of the primary winding 89 of a transformer 88 and the upper end of the primary winding is connected to a +210 volt source. The screen grid is connected through a resistor 85 to a suitable source of positive potential, and the suppressor and cathode are commonly connected to a source of +14 volts to maintain the tube normally cut off. A coincidence gate 82 supplies triggering potential to the control grid of the pentode. The coincidence gate 82 is comprised of a pair of diodes 83 and 84 having their anodes commonly connected to the conductor 86 and further connected by a resistor 85 to a source of +210 volts. The cathode of the diode 83 is connected by lead 42 to the delay circuit 39 and the cathode of diode 84 is connected by conductor 40 to the timing pulse source 52.

The timing pulse source 52 may be any suitable source, for example, the timing track and pulse generation circuits of a magnetic drum storage system. The periodic trigger pulses which are supplied to the conductor 40 coincide in time with the clock pulses and rise from a quiescent level of zero volts to a +14 volt potential.

The delay circuit 39, except when the counter stands at the count of nine, applies a zero volt D.-C. potential to the cathode of diode 83. With a zero volt potential on its cathode, diode 83 conducts to place the zero volt potential upon the input conductor 86 of the pentode and also upon the anode of diode 84. The +14 volt trigger pulses find the diode 84 non-conducting because its cathode is more positive than its anode. Therefore as long as the conductor 42 remains at a zero volt potential, the conductor 86 remains at zero volts also; and the trigger pulses are ineffective to overcome the cut-off bias of the pentode 95.

However, when the counter stands at a count of nine, delay circuit 39 applies a +14 volt D.-C. potential to the cathode of diode 83. With the conductor 40 at its inter-pulse level of zero volts, the diode 84 conducts and conductor 86 assumes the zero volt potential. However when the trigger pulse raises the potential of the cathode of diode 84 to +14 volts, both diodes 83 and 84 are coincidently at +14 volts, and both conduct to raise the potential of conductor 86 to +14 volts also. In response, pentode 95 conducts for the duration of the trigger pulse and energizes the primary winding 89 to induce oppositely polarized signals in the secondary windings 90 and 91 of the transformer 88.

The secondary winding 90 is connected at its lower end to −12 volts and at its upper end to output conductor 56. With pentode 95 non-conducting, conductor 56 assumes the −12 volt potential. However, when the pentode 95 is pulsed to energize the transformer a positive-going signal is induced in the secondary winding 90 to raise the conductor 56 to a potential of about zero volts. In similar manner the secondary winding 91 is connected at its upper end to ground potential and at its lower end to output conductor 48. With pentode 95 cut off, conductor 48 displays the ground potential. However, when the transformer is pulsed in response to the timing pulse following the ninth input signal, the conductor 48 is driven more negative than −12 volts. Damping and clamping means may be added to the secondary windings 90 and 91 of the transformer if desired.

The input coincidence gate 50 of Fig. 2 is comprised of a pair of diodes 151 and 152 having their anodes commonly connected to the cathode of a diode 53 whose anode is connected through a resistor 154 to a source of +210 volts. The complementing input conductor 53 for the first flip-flop $21_1$ is projected from the junction of the diode 153 with resistor 154. The cathode of diode 151 is supplied with the input signals to be counted and the cathode of diode 152 is supplied with periodic clock pulses. The clock pulses comprise narrow positive-going signals which rise from a quiescent level of −12 volts to a potential of zero volts. The signals supplied to the diode 151 comprise interspersed zero and −12 volt potentials synchronized with the clock pulses and representing binary one and binary zero, respectively, of which it is desired to count only the binary one signals. Only the coincident application of a zero-volt binary one signal and a zero-volt clock pulse to the coincident gate 50 raises the potential of input conductor 53 to a zero volt potential and effects switching of the flip-flop $21_1$. Under this condition all three of the diodes 151, 152, and 153 conduct to place the zero volt potential upon input conductor 53 of flip-flop $21_1$. However, if a −12 volt binary zero potential is applied to the cathode of diode 151, only the diodes 151 and 153 conduct to place the −12 volt potential both upon input conductor 53 of flip-flop stage $21_1$ and upon the anode of diode 152 to prevent conduction thereof at clock pulse time. The flip-flop input conductor 53 is already clamped to −12 volts and therefore the binary zero signal has no effect upon the flip-flop stage $21_1$.

Input coincidence gate 50 is also provided with a second output conductor 54 which is projected from the commonly connected anodes of the diodes 151 and 152 and is connected to the cathode of diode 155 of the coincidence gate 55. The coincidence gate 55 comprises a pair of diodes 155 and 156 having their anodes commonly connected through a resistor 157 to a source of +210 volts. The output conductor 59 of "and" gate 55 is projected from the commonly connected anodes of diodes 155 and 156 and is connected through diodes 158, conductor 58, and diode 159 to the grid of triode 148. The cathode of diode 156 is connected by conductor 46 to the output conductor 56 of amplifier circuit 41. In response to the application of the tenth signal to be counted, a zero volt signal is applied to diode 155 of coincidence gate 55; and simultaneously, the pulse amplifier 41 applies a zero volt potential to the diode 156 of the "and" gate 55 via the conductor 56. This simultaneous application of zero volt potentials to the cathodes of both diodes 155 and 156 causes both diodes to conduct to apply a zero volt potential to conductor 59 which applies the zero volt potential through diodes 158, conductor 58, and diode 159 to the grid of triode 148 to effect conduction of the triode and resetting of flip-flop $\mathbf{24_8}$ to its "0" state. With the counter standing at any count other than nine, amplifier circuit 41 applies a −12 volt potential via conductor 56 to the cathode of diode 156. In response to the application of the −12 volt potential, diode 156 conducts to apply the −12 volt potential both to the conductor 59 and to the anode of diode 155. With the −12 volt potential on the anode of diode 156, the zero volt signals from "and" gate 50 find diode 155 cut off and are unable to cause resetting of the fourth flip-flop $\mathbf{24_8}$.

The diode 153 functions to prevent a malfunction of the counter. If the diode 153 were not present and in response to the tenth input signal to be counted the first flip-flop stage $\mathbf{21_1}$ were to trigger before the fourth flip-flop stage $\mathbf{24_8}$, the pulse at the commonly connected anodes of the diodes 151 and 152 would be chopped short. As a result the fourth flip-flop stage may not be triggered. This diode 153 prevents the first flip-flop from pulling down the potential at the anodes of diodes 151 and 152.

It is seen that diodes 158 and 160 having their cathodes commonly connected to conductor 58 comprise the equivalent of the logical "or" gate 57 of the logical diagram of Fig. 1. A zero volt potential applied to the anode of either diode 158 or 160 accomplishes clearing, or setting to "0," of the fourth flip-flop stage $\mathbf{24_8}$.

Although the amplifier 41 has been illustrated as a pulse amplifier, an amplifier producing D.-C. potential outputs could be substituted if desired with minor modifications to the circuit.

It is seen from the foregoing description of the invention that a novel decade counter circuit is provided exhibiting features of advantage over the prior art devices. Having therefore described the invention and its mode of operation, those features of novelty believed descriptive of the nature and scope of the invention are described with particularity in the appended claims.

What is claimed is:

1. A binary decade counter for producing an output signal at the count of nine, said counter comprising four intercoupled bistable-state flip-flop binary counter stages each having the same preselected state at the beginning of the count, the intercoupling means at least from one stage to one other stage including a cathode impedance tuned to a frequency defining a trigger pulse for the succeeding stage and shunted by a unidirectionally conductive damping device for producing a single output pulse in response to each transition of the respective flip flop to said preselected one of its two bistable states; a source of input signal pulses to be counted; a source of timing pulses; means including a coincidence gate responsive to the concurrence of input signals and timing signals for applying said signal pulses to be counted to the first stage; an output circuit coupled to and jointly controlled by the first and fourth stages for delivering a count-of-nine D.-C. signal in response to the ninth input signal pulse, said output circuit including a coincidence detector circuit for detecting D.-C. level signals at said first and fourth stages and for delivering a D.-C. signal when each said first and fourth stages is concurrently in that one of its two bistable states which is opposite from the said preselected state, output means responsive to said count-of-nine D.-C. signal and to the succeeding timing pulse for developing a count-of-nine output pulse at the time of said succeeding timing pulse; an inhibit circuit coupled to and controlled by said output means for disconnecting the second flip-flop stage from the first stage in response to said count-of-nine output pulse, thereby to prevent a tenth input signal pulse from passing the first stage; and a clearing circuit coupled to and jointly controlled by both the source of input signal pulses and the output means for clearing the fourth stage in response to every tenth input signal pulse, said clearing circuit including a coincidence detector which in response to a count-of-nine output pulse and the tenth input signal pulse delivers a clearing signal to set the fourth state in its said preselected state.

2. Apparatus as claimed in claim 1 characterized by the inclusion of means for developing count-of-nine output pulses of both polarities, and further characterized in that the inhibit circuit is responsive to output pulses of one polarity and the clearing circuit is responsive to output pulses of the other polarity.

3. A binary type decade counter for delivering an output signal at the count of nine, said counter comprising four bistable-state flip flops connected as binary counters, each of said flip flops being comprised of a pair of unidirectionally conductive devices having anode and cathode electrodes; means for initially setting each of said flip flops to a cleared condition in the same preselected state; means for developing output pulse signals from each said first, second and third flip flops in response to the respective flip flop changing to said preselected state from its other state, said means comprising for each said flip flop a cathode load impedance tuned to produce a pulse for triggering the succeeding flip flop and shunted by a unidirectionally conductive damping device; a source of input pulses to be counted; a source of timing pulses; means including a coincidence gate responsive to the coincidence of an input pulse and a timing pulse for applying input pulses to be counted to said first flip flop to change its state in response to each pulse so applied; means for applying to said second flip flop output pulse signals developed by said first flip flop across the cathode load impedance of the first flip flop when it changes to said preselected state from its other state thereby to change the state of said second flip flop in response to each pulse signal so applied; means for applying to said third flip flop output pulse signals developed by said second flip flop across the cathode load impedance of the second flip flop when it changes to said preselected state from its other state thereby to change the state of said third flip flop in response to each pulse signal so applied; means for applying to said fourth flip flop output pulse signals developed by said third flip flop across the cathode load impedance of the third flip flop when it changes to said preselected state from its other state thereby to change the state of said fourth flip flop in response to each pulse signal so applied; means for deriving a D.-C. output signal from said fourth flip flop when it is in a state opposite to the said preselected state; means for deriving a D.-C. output signal from said first flip flop when it is in a state opposite to the said preselected state; means including an output coincidence gate responsive to the concurrence of said D.-C. output signals derived from said first and fourth flip flops for developing a count-of-nine D.-C. signal in response to the ninth input pulse; means responsive to said count-of-nine D.-C. signal and to the following timing pulse for developing a count-of-nine output pulse at the time of the said following timing pulse; an inhibit gate connected between said first and second flip flops; means for applying said count-of-nine output pulse to said inhibit circuit to inhibit a change of state of said second flip flop when said first flip flop changes from its opposite to its preselected state in response to the tenth input pulse; a resetting coincidence gate to which said input pulses and said count-of-nine output pulses are applied for developing a clearing signal for said fourth stage upon coincidence of said signals so applied to said resetting gate; and means for applying said clearing signal to said fourth flip flop to change it from its opposite to its said preselected state, whereby each of said four flip flops is cleared to said preselected state at the end of the tenth input pulse, thereby to be in condition for receiving further input pulses to be counted.

References Cited in the file of this patent

UNITED STATES PATENTS

| | | |
|---|---|---|
| 2,427,533 | Overbeck | Sept. 16, 1947 |
| 2,566,918 | Bergfors | Sept. 4, 1951 |
| 2,698,383 | Moody | Dec. 28, 1954 |
| 2,706,811 | Steele | Apr. 19, 1955 |